United States Patent [19]

Markle et al.

[11] 3,769,516

[45] Oct. 30, 1973

[54] METHOD AND APPARATUS FOR SENSING FLUORESCENCE RADIATION

[75] Inventors: David A. Markle, Norwalk; Eugene R. Schlesinger, Wilton, both of Conn.

[73] Assignee: The Perkin-Elmer Corporation, Norwalk, Conn.

[22] Filed: Dec. 4, 1972

[21] Appl. No.: 311,847

[52] U.S. Cl. .................... 250/363, 250/214, 356/96, 356/97

[51] Int. Cl. .................... G01j 3/00

[58] Field of Search .................... 250/363, 365, 214, 250/339; 356/96, 97

[56] References Cited

UNITED STATES PATENTS

| | | | |
|---|---|---|---|
| 3,435,213 | 3/1969 | Colbow et al. | 250/363 X |
| 3,520,614 | 7/1970 | Goldstein | 356/97 |
| 3,598,994 | 8/1971 | Markle | 250/363 |

*Primary Examiner*—Archie R. Borchelt
*Attorney*—John K. Conant

[57] ABSTRACT

A fluorescence radiation detector of the Fraunhofer line discriminator type. A sky telescope and an earth telescope each form radiation beams which are directed to a single optical chopper. The chopper sequentially directs each beam through a single Fabry-Perot filter centered at the Fraunhofer line and a single neutral density filter. The chopped segments are recombined to form a beam containing $A$, $B$, $C$, and $D$ portions in time sequence where:

$A$ = the direct solar intensity within the continuum;
$B$ = the direct solar intensity inside the selected Fraunhofer line;
$C$ = the reflected solar intensity inside the selected Fraunhofer line; and
$D$ = the reflected solar intensity in the continuum.

A single photomultiplier tube with a blocking filter in front receives the beam and produces corresponding sequential electrical pulses which are electronically processed to yield fluorescence ($p$) from the equation $$p = (K/A - B)\ (C - D\ (B/A)).$$

11 Claims, 8 Drawing Figures

PATENTED OCT 30 1973

3,769,516

METHOD AND APPARATUS FOR SENSING FLUORESCENCE RADIATION

The foregoing abstract is not to be taken either as a complete exposition or as a limitation of the present invention. In order to understand the full nature and extent of the technical disclosure of this application, reference must be had to the following detailed description and the accompanying drawings as well as to the claims.

BACKGROUND OF THE INVENTION

In U.S. Pat. No. 3,598,994, which issued Aug. 10, 1971, there is disclosed a method and apparatus for sensing fluorescent substances. As disclosed therein, the technique involved the measurement of the intensity of direct sunlight within a Fraunhofer line and in the solar continuum near the Fraunhofer line. Reflected sunlight from the earth was measured at the same wavelengths. The resulting radiations were converted to electrical signals $A$, $B$, $C$, and $D$ where:

$A$ = the direct solar intensity within the continuum;
$B$ = the direct solar intensity inside the selected Fraunhofer line;
$C$ = the reflected solar intensity inside the selected Fraunhofer line; and
$D$ = the reflected solar intensity in the continuum.

The above four signals were treated electronically to yield fluorescence ($p$) in accordance with the following equation:

$$p = (K/A - B)\ [C - D(B/A)]$$

where $K$ is a constant of proportionality.

The apparatus described in the above-mentioned patent derived the four signals by means of a pair of choppers operating at different speeds. One was positioned in the beam of direct sunlight and the other in the beam of reflected sunlight. The chopped, and therefore coded, beams were then combined at one beam splitter and split at another. One split beam was directed through a Fabry-Perot interference filter at the Fraunhofer line and into a photomultiplier. The other split beam was passed through a second Fabry-Perot filter in the solar continuum and into a second photomultiplier. The electronics portion of the apparatus then converted the two frequency multiplexed signals into the required four separate signals.

Although the invention disclosed and claimed in the above referenced patent was quite useful, there were certain disadvantages which it would be desirable to correct. One such problem was limited sensitivity resulting from the presence of polarizers and beam splitters and the fact that the photon noise of one signal could interfere with another. Secondly, the apparatus was relatively costly and complex due to the requirement for duplication of many elements, such as choppers, Fabry-Perot filters, and photomultipliers. Third, the requirement for two photomultipliers made it extremely difficult to incorporate automatic gain control to compensate for changes in ambient lighting.

Accordingly, the objects of the present invention are to provide improved method and apparatus of the Fraunhofer line discriminator type which has increased sensitivity, reduced cost and complexity, and automatic gain control to compensate for changes in ambient lighting. The manner in which the foregoing objects are achieved will be apparent from the following description and appended claims.

SUMMARY OF THE INVENTION

There is provided an apparatus for sensing fluorescence radiation emitted by a material excited by sunlight which comprises: means for forming a first beam of direct sunlight; and means for forming a second beam of reflected sunlight and solar stimulated flourescence radiation from the material. A first Fabry-Perot filter is provided which, when suitably blocked, passes only light within a preselected Fraunhofer absorption line, and a second blocking filter is provided which passes light in the solar continuum either side and including the preselected Fraunhofer line. Means are provided for passing the first and second beams sequentially through either both the Fabry-Perot and blocking filter or just the blocking filter to obtain four time-displaced radiation bursts representative of the A, B, C, and D signals. The four time multiplexed signals are received by a single means for converting the radiation bursts into sequential signals and these sequential signals are then converted into a single signal proportional to the solar stimulated flourescence radiation from the material.

DESCRIPTION OF THE PREFERRED EMBODIMENT

Figure 1:
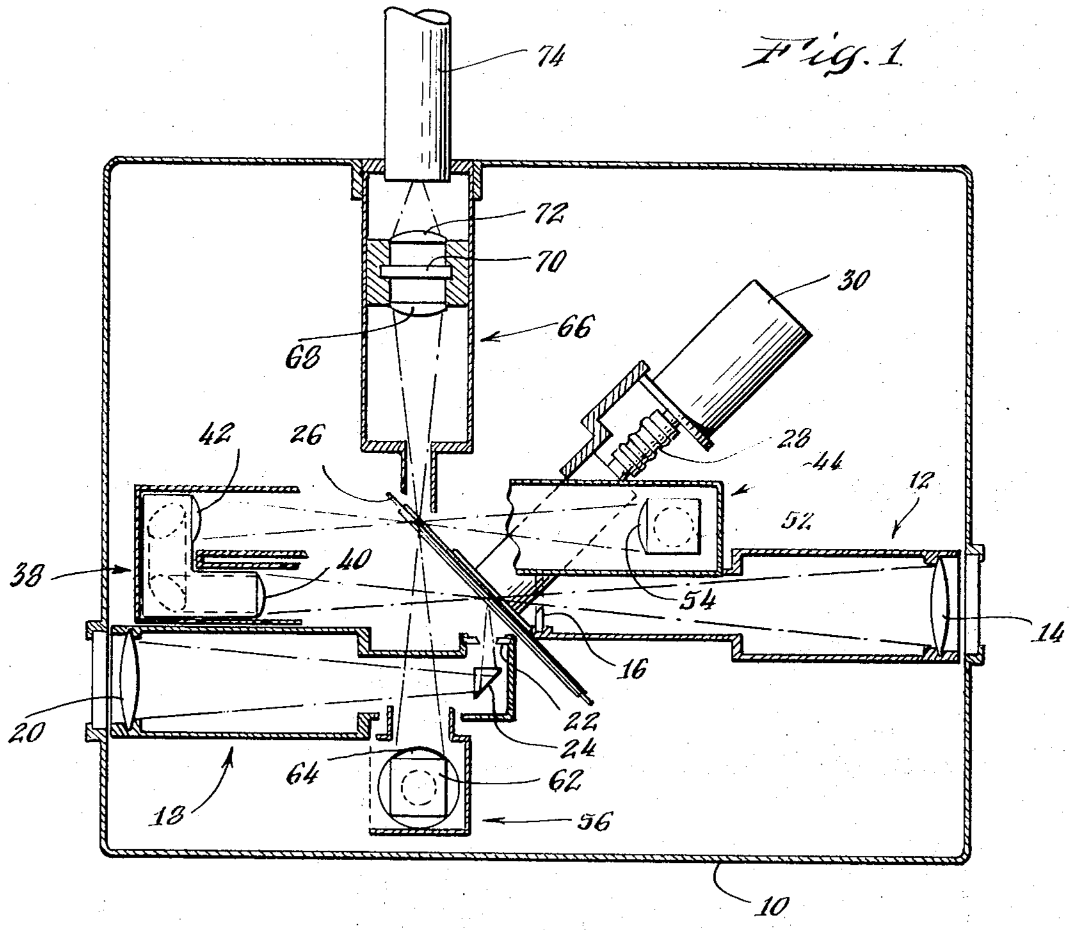
FIG. 1 is a plan view, partially cross sectioned and partially broken away, illustrating the optical system of the invention.
Figure 2:
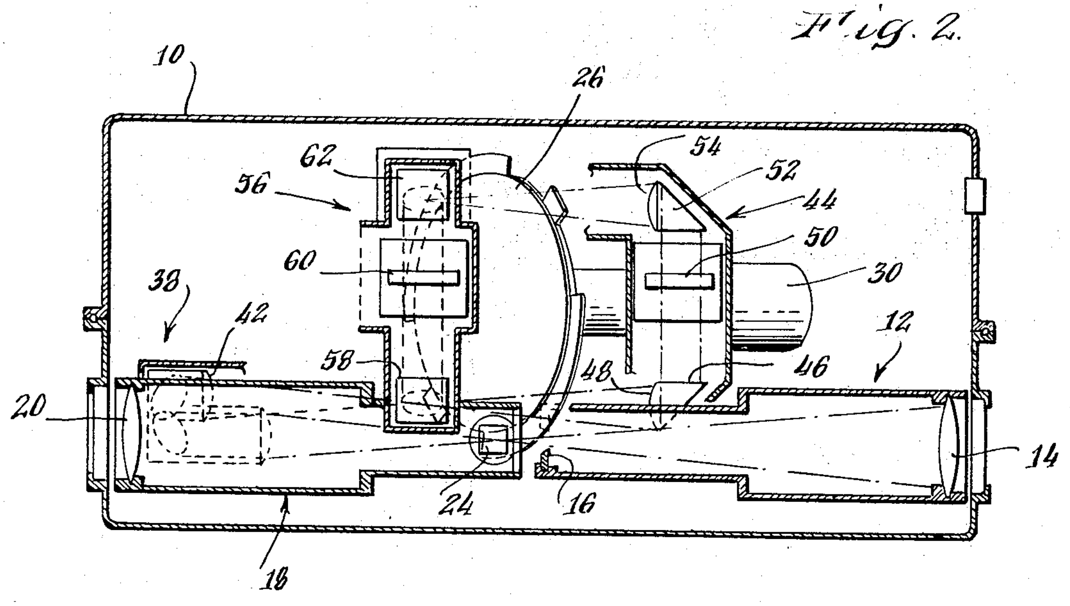
FIG. 2 is a front view of the optical system of FIG. 1.
Figure 3:
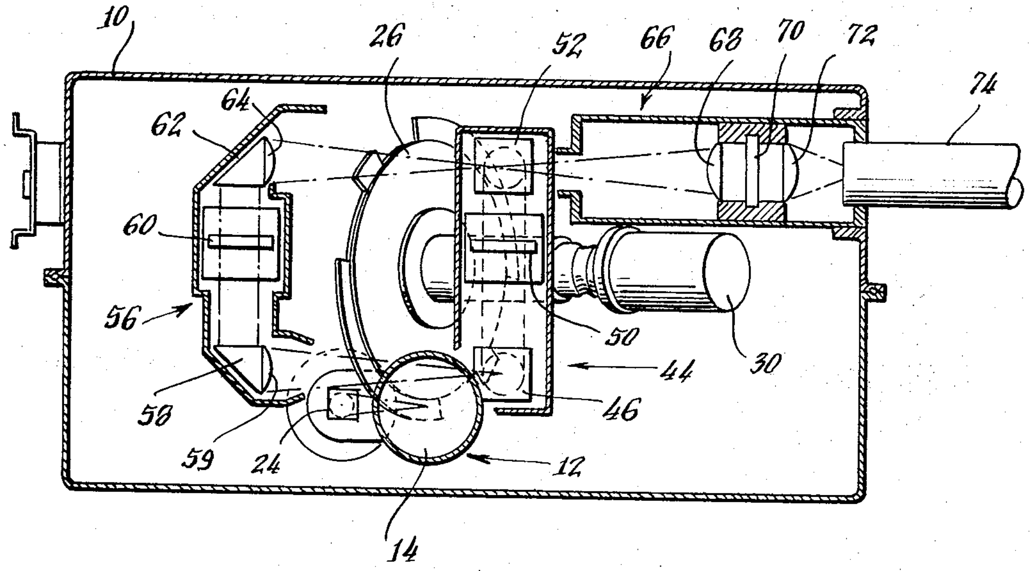
FIG. 3 is a right end view of the optical system of FIG. 1.

With reference to FIGS. 1–3, the optical unit of the present invention comprises a housing 10 containing an earth telescope 12 having a $f/5$ collector lens 14 and a field stop 16. A sky viewing telescope 18 has a similar collector lens 20 and field stop 22, with an internally reflecting prism 24 therebetween to rotate the collected light 90° as shown in FIG. 1. Radiation from lenses 14 and 20 is thereby brought to a common focus, or image point, and a chopper 26 is positioned with its bottom edge at such image point and in a plane 45° to the incoming radiation. The chopper is rotated through a flexible coupling 28 by a 6,000 rpm motor 30. As will be seen from FIG. 5, the periphery of chopper wheel 26 is divided into reflective 32 and clear 34 segments by blackened segments 36. As will be apparent from the foregoing description, the optical axes of earth telescope 12 and sky telescope 18 are in the same plane. A 180° prism assembly 38 is positioned with its entry face, carrying collimating lens 40, in the optical axis of earth telescope 12. Its exit face, carrying collimating lens 42, is raised so as to refocus the radiation onto chopper 26 at a second image point on the periphery 45° from the first formed image.

Positioned on the opposite side of chopper 26 is a filter assembly 44. This assembly includes entrance prism 46, upon which is mounted a collimating lens 48, on the optical axis of lens 42. Prism 46 directs radiation upwardly through a neutral density filter 50 to an exit prism 52. A lens 54 on exit prism 52 is positioned to redirect radiation to a focus on chopper 26 at a third image point on the periphery rotated 90° from the second image point.

A second filter assembly 56 of generally similar construction has its entrance prism 58 and collimating lens 59 in the plane of the common optical axis of lenses 42 and 48 and along an optical axis at 45° to the plane of chopper 26. Radiation from the entrance prism 58 is passed upwardly through a Fabry-Perot filter 60. This filter is selected to pass only radiation within a preselected Fraunhofer line, such as 5,890A. Radiation passing through this filter is redirected by an exit prism 62 and lens 64 to the third image point on chopper 26. Positioned along the optical axis of lens 64 but on the opposite side of chopper 26 is a photomultiplier tube assembly 66. This assembly comprises a collimating lens 68, a blocking filter 70, a condenser lens 72, and a photomultiplier tube 74.

Apparatus constructed in accordance with this invention provides an increase in sensitivity over the previously patented device of approximately one order of magnitude. This results from the absence of polarizers and beam splitters, and probably most importantly, by the fact that the A, B, C, and D signals are time sequenced rather than frequency multiplexed. The manner in which these signals are formed will be most clearly apparent from the simplified diagrams of FIGS. 4 and 5, taken in conjunction with FIGS. 1–3.

Figure 4:
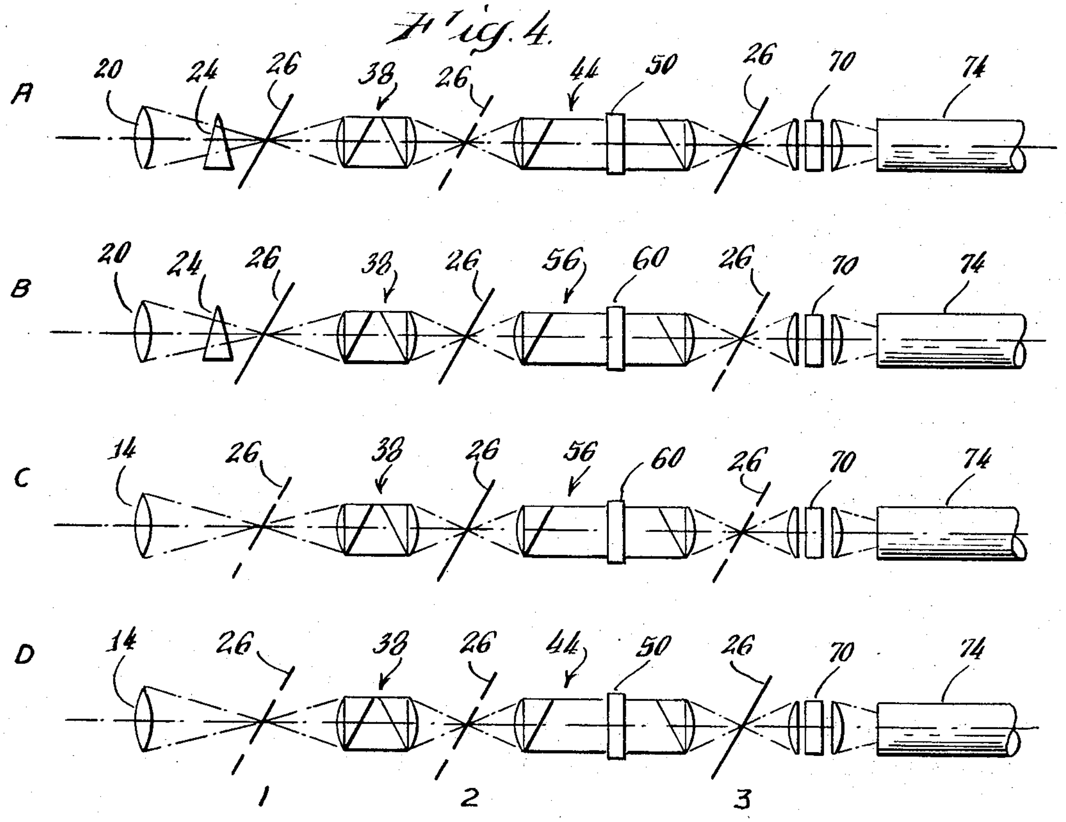
FIG. 4 is a simplified schematic of the optical path for each signal.

In FIG. 4, the light path is shown unfolded and the passes to the chopper are represented as separate choppers 26 at each point. When a reflection occurs, the chopper is shown solid. When it is transmitting, it is shown by dashed lines.

Figure 5:
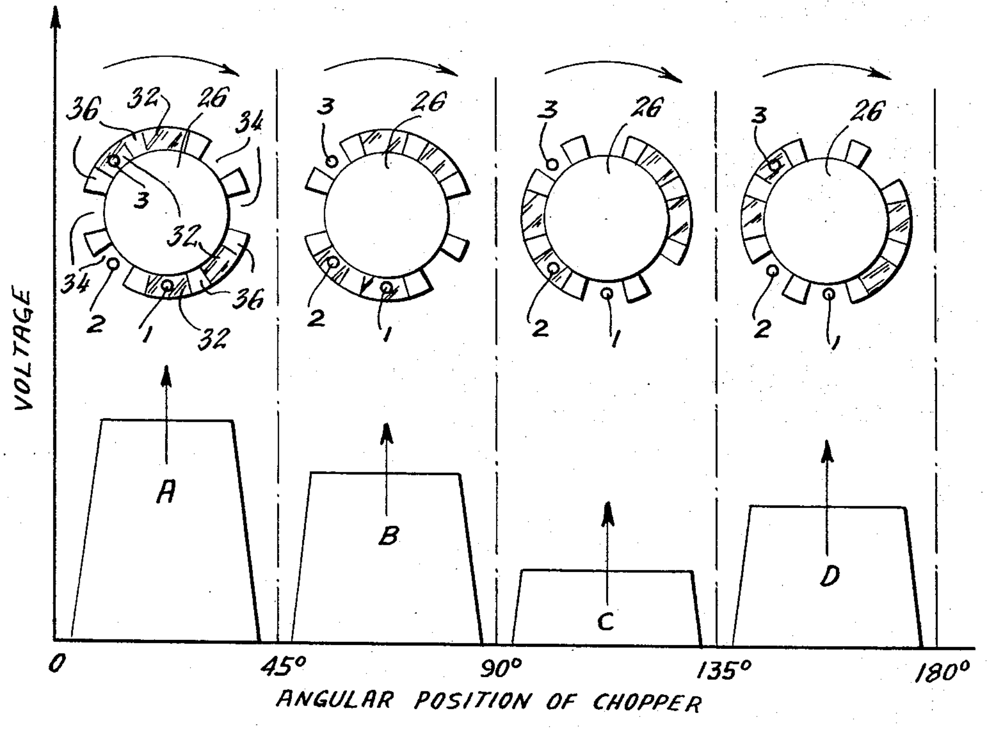
FIG. 5 illustrates the time sequenced signal produced by the optical system of FIGS. 1–3, with diagrams of the corresponding chopper positions.

FIG. 5 represents the signals produced by the photomultiplier tube and the position of the chopper 26 at the center of the signal as indicated by the arrow. The image points on the chopper at such times are indicated by the circles numbered "1," "2," and "3".

The A signal is produced by radiation entering collector lens 20 and passing through prism 24 and being reflected at image point 1 by chopper 26. It then passes through prism assembly 38 and passes through chopper 26 at image point 2. Thereafter, it passes through filter assembly 44 and neutral density filter 50, being once again reflected from chopper 26 at image point 3. From the chopper it passes through blocking filter 70 to photomultiplier tube 74.

Signal B is similarly produced by radiation from collector lens 20 passing through prism 24 and being reflected from chopper 26 at image point 1. It then passes through prism assembly 38 and is again reflected from chopper 26 at image point 2. Thereafter it passes through filter assembly 56 and Fabry-Perot filter 60. It then passes through chopper 26 and blocking filter 70 to the photomultiplier tube 74.

Signal C is produced by radiation from collector lens 14 which passes through chopper 26 at image point 1 and through filter assembly 38. It is thereafter reflected from chopper 26 at image point 2, passing then through filter assembly 56 and Fabry-Perot filter 60. It passes through chopper 26 at image point 3 and through blocking filter 70 to photomultiplier tube 74.

The D signal is produced by radiation from collector lens 14 passing through chopper 26 at image point 1 and through prism assembly 38. It then passes through chopper 26 at image point 2 and through filter assembly 44 and neutral density filter 50. Thereafter, it is reflected off chopper 26 at image point 3 through the blocking filter 70 to photomultiplier tube 74.

In the prior art, a second Fabry-Perot filter was included in the A and D signal paths to isolate a wavelength in the continuum near the Fraunhofer line. This has been found to be unnecessary as the blocking filter passes a sufficiently wide portion of the spectrum to suitably approximate the continuum. The function of the neutral density filter 50 is to match the attenuation to that of the Fabry-Perot filter so as to minimize the range of the four sequential signals.

Figure 6:
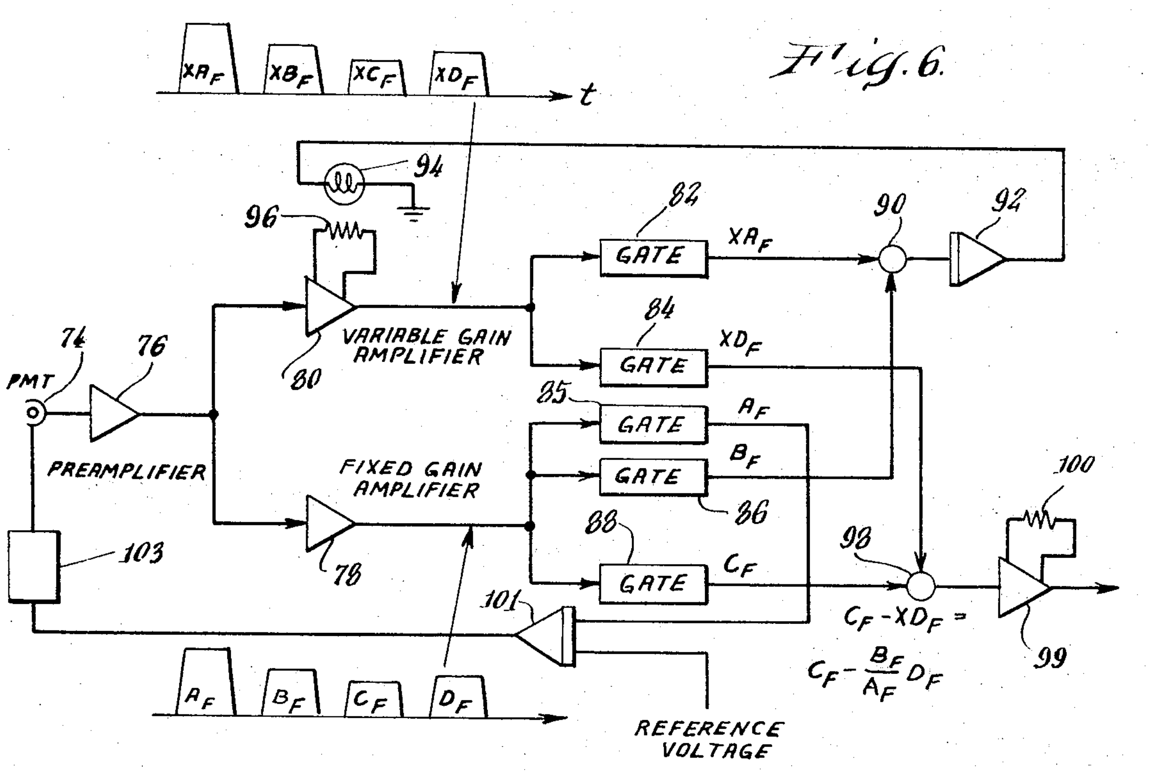
FIG. 6 is a schematic diagram of the computation circuit employed with the invention.

The electronics for implementing the calculation of fluorescence is illustrated in FIG. 6. The pulse train from the photomultiplier tube 74 is passed through a preamplifier 76 and then through a fixed gain amplifier 78 and a variable gain amplifier 80. The output of the fixed gain amplifier is the train of pulses $A_F$, $B_F$, $C_F$, and $D_F$ and that of the variable gain amplifier the train of pulses $XA_F$, $XB_F$, $XC_F$, and $XD_F$, where X is the gain. The output from variable gain amplifier 80 is passed through gates 82, 84 whose respective outputs contain d.c. components proportional to $XA_F$ and $XD_F$. The output of fixed gain amplifier 78 is passed through gates 85, 86, 88, whose respective outputs contain d.c. components proportional to $A_F$, $B_F$ and $C_F$. The $XA_F$ and $B_F$ signals are subtracted by a difference circuit 90 and the resultant signal drives an integrator 92 which controls a light emitting diode 94. A photoconductive feedback resistor 96 controls the gain of amplifier 80 to maintain $XA_F$ equal to $B_F$.

As $$XA_F = B_F$$

then $$X = B_F/A_F$$

This means that output $XD_F$ is equivalent to $(B_F/A_F)\ D_F$ and can be directly subtracted by difference circuit 98 from $C_F$. This signal is supplied to final amplifier 99 which provides filtering and introduces the scaling factor $K/A-B$. This latter function is done by means of a second light dependent resistor 100. Resistor 100 is matched to resistor 96 and is similarly exposed to illumination from light emitting diode 94. The output of final amplifier 98 then becomes proportional to the flourescence multiplied by a constant.

Automatic gain control of the photomultiplier is supplied by an integrator 101 which receives both a d.c. reference voltage and the signal from gate 85 and controls a controlled high voltage power supply 103 which controls the gain of photomultiplier 74.

Figure 8:
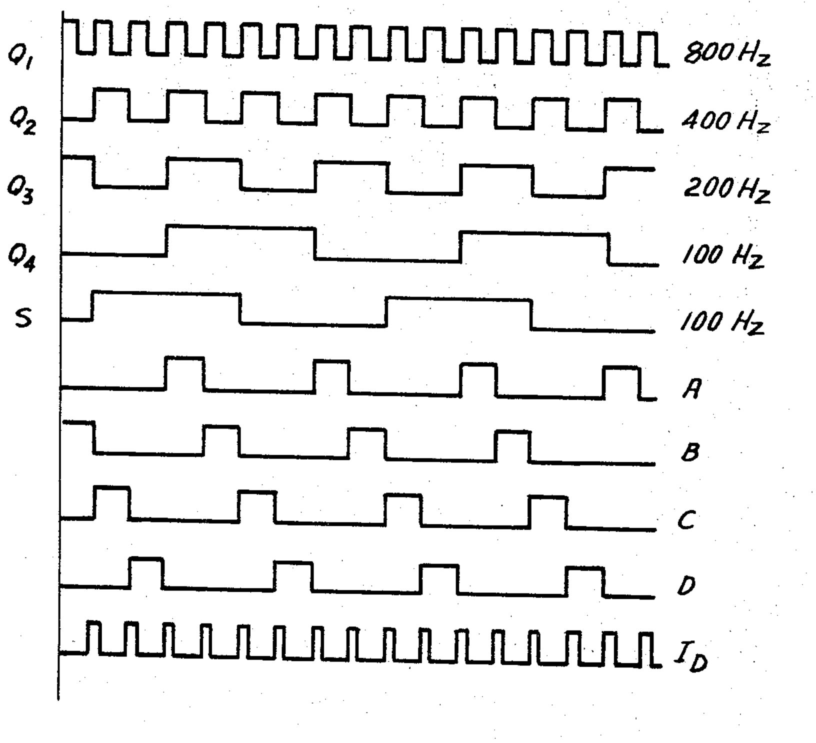
FIG. 8 illustrates waveforms produced within the circuit of FIG. 7.
Figure 7:
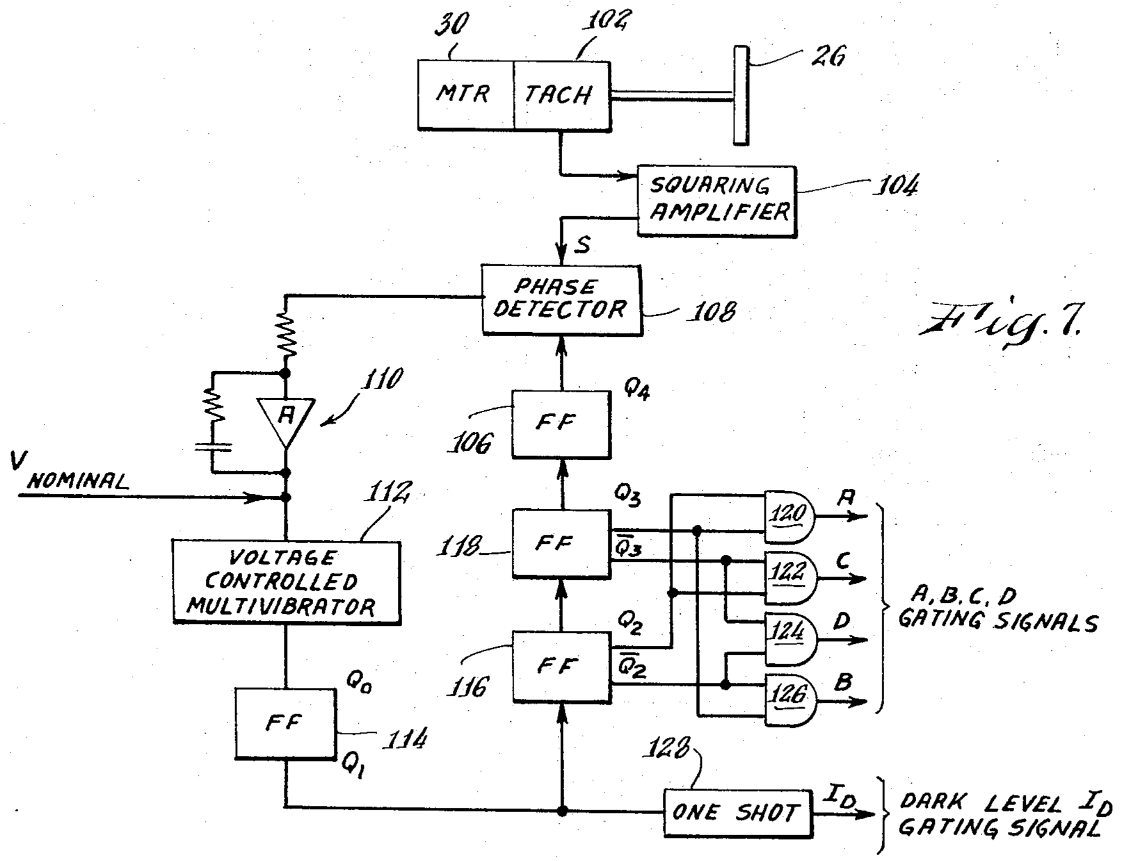
FIG. 7 is a block diagram of the gating generator circuitry of the invention.

The gating signals are supplied by the circuit of FIG. 7 which, in the following description, is referenced to the waveforms of FIG. 8. Optical chopping is performed by chopper 26 driven by 6,000 rpm motor 30. An integrally mounted tachometer 102 supplies a squaring amplifier 104. The squared output signal S is automatically maintained in quadrature with Q4, the output of flipflop 106. Any departure from this condition causes either a positive or negative error voltage from the phase detector 108 which is fed through an integrator 110 to a voltage controlled multivibrator 112. The resulting output frequency shift, as reflected through the chain of flipflops 114, 116, 118, 106 is such as to correct the phase error condition. Thus, the waveforms Q1 through Q4 are all time referenced relative to signal S which, in turn, is positionally referenced to the optical chopper. The signals Q2 and Q3 are utilized as inputs to AND gates 120, 122, 124, 126. The outputs are gating signals as shown that are correctly time phased with pulses A, B, C, D, and $I_D$. The $I_D$ signal is generated by the positive going edge of Q1 actuating a one-shot multivibrator 128 to generate a short pulse during the off interval between consecutive signal pulses. This facilitates sampling of he waveform level existing under zero light conditions and use of feedback to maintain zero level and compensate for bias errors due to phototube and other electronics.

It is believed that the many advantages of this invention will now be apparent to those skilled in the art. It will also be apparent that a number of variations and modifications may be made therein without departing from its spirit and scope. Accordingly, the foregoing is to be construed as illustrative only, rather than limiting. This invention is limited only by the scope of the following claims.

We claim:

1. Apparatus for sensing fluorescence radiation emitted by a material excited by sunlight comprising:
  means for forming a first beam of direct sunlight;
  means for forming a second beam of reflected sunlight and solar stimulated flourescence radiation from the material;
  first filter means for passing only light within a preselected Fraunhofer absorption line;
  second filter means for passing light in the solar continuum near said preselected Fraunhofer absorption line;
  means for passing said first and second beams sequentially through said first and second filter means to form a single composite beam comprising four time displaced radiation bursts representative of
    A. sunlight in the solar continuum near said Fraunhofer line,
    B. sunlight within said Fraunhofer line,
    C. reflected sunlight and fluorescence radiation within said Fraunhofer line, and
    D. reflected sunlight and fluorescence radiation in the solar continuum near said Fraunhofer line;
  single means for receiving said composite beam and converting said radiation bursts into sequential signals proportional to the respective intensities of A, B, C, and D; and
  means for receiving said sequential signals and converting them into a single signal proportional to the solar stimulated fluorescence radiation from the material.

2. The apparatus of claim 1 wherein said passing means comprises a single light chopper positioned to direct each of said beams sequentially through said first and second filter means.

3. The apparatus of claim 1 wherein said first filter means is a Fabry-Perot filter.

4. The apparatus of claim 1 wherein said receiving means comprises a phototube.

5. The apparatus of claim 1 wherein said receiving means comprises means for converting said sequential signals into said single signal in accordance with the formula $$p = (K/A-B)\ [C - D(B/A)].$$

6. The apparatus of claim 5 wherein said converting means comprises:
  a fixed gain amplifier connected to receive said sequential signals;
  first and second gating mean for passing amplified B and C signals from said fixed gain amplifier;
  a variable gain amplifier connected to receive said sequential signals;
  third and fourth gating means for passing amplified A and D signals from said variable gain amplifier;
  means for adjusting the gain of said variable gain amplifier to maintain said amplified A signal equal to said amplified B signal;
  means for producing an intermediate signal proportional to the difference between said amplified C and D signals; and
  means for amplifying said intermediate signal by the factor $(K/A-B)$, where $K$ is a constant, to provide an output signal.

7. The apparatus of claim 2 wherein said receiving means comprises means for converting said sequential signals into said single signal in accordance with the formula $$p = (K/A-B)\ [C - D\ (B/A)].$$

8. The apparatus of claim 7 wherein said receiving means comprises gated detectors for each of said sequential signals.

9. The apparatus of claim 8 wherein said receiving means comprises means for generating gating signals from the rotation of said chopper.

10. The method of sensing flourescence radiation emitted by a material excited by sunlight comprising:
  forming a first beam of direct sunlight;
  forming a second beam of reflected sunlight and solar stimulated fluorescence radiation from the material;
  chopping and filtering said first and second beams to form a single composite beam comprising four time displaced radiation bursts representative of
    A. sunlight in the solar continuum near a preselected Fraunhofer line,
    B. sunlight within said Fraunhofer line,
    C. reflected sunlight and fluorescence radiation within said Fraunhofer line, and
    D. reflected sunlight and flourescence radiation in the solar continuum near said Fraunhofer line;
  converting said radiation bursts into sequential signals proportional to the respective intensities of A, B, C, and D; and
  converting said sequential signals into a single signal proportional to the solar stimulated flourescence radiation from the material.

11. The method of claim 10 wherein said sequential signals are converted into said single signal in accordance with the formula $$p = (K/A-B)\ [C - D\ (B/A)].$$

* * * * *